May 22, 1923.   1,455,844

J. LANG

VEHICLE WHEEL

Filed June 10, 1921

John Lang.
INVENTOR

BY *Victor J. Evans*
ATTORNEY

WITNESS:

Patented May 22, 1923.

1,455,844

UNITED STATES PATENT OFFICE.

JOHN LANG, OF PHILADELPHIA, PENNSYLVANIA, ASSIGNOR OF ONE-HALF TO FRANK PEER, OF PHILADELPHIA, PENNSYLVANIA.

VEHICLE WHEEL.

Application filed June 10, 1921. Serial No. 476,516.

*To all whom it may concern:*

Be it known that I, JOHN LANG, a citizen of Roumania, residing at Philadelphia, in the county of Philadelphia and State of Pennsylvania, have invented new and useful Improvements in Vehicle Wheels, of which the following is a specification.

This invention relates to wheels for vehicles and it has more partciular reference to wheels for motor propelled vehicles, the primary object being to provide a wheel tire which will elastically support the load upon a composite cushion tire.

Another object of the invention is to provide a wheel tire having what may be termed a cushion effect and by the use of which should any part or parts thereof become damaged, said damaged part or parts can readily be replaced.

A still further object of my invention is to provide a wheel tire which is cheap to manufacture and which can be expeditiously repaired.

With the foregoing and other objects in view as will be clearly apparent as this description proceeds, my invention consists essentially of a wheel tire comprising an annular band to which is attached segmental resilient sections, and in the novel formation and arrangement of parts hereinafter specifically set forth.

In the further disclosure of the invention reference is to be had to the accompanying drawings constituting a part of this specification and in which like characters of reference designate the same or corresponding parts in all the views.

Figure 1:
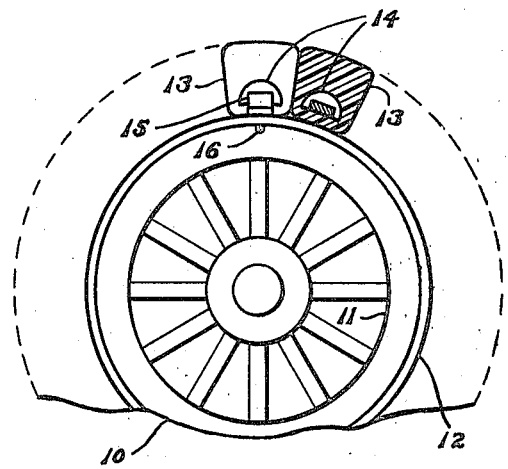
Figure 1 is a broken side view of an ordinary truck wheel having my invention applied thereto, parts being broken away or in section for a better understanding thereof.
Figure 2:
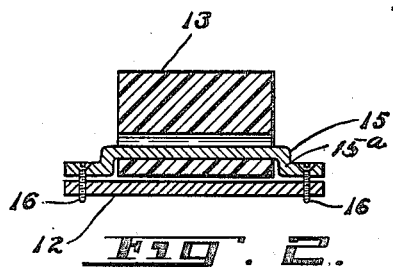
Figure 2 is an enlarged section taken transversely through one form of my improved wheel tire.

Referring to the drawings the numeral 10 designates a fragmentary portion of a truck wheel and 11 the rim or felly thereof. According to my invention I secure in any of the well known ways on the rim or felly 11 an annular metal ring or tread 12 of appropriate dimensions and suitable cross-section. Transversely of this annular ring or tread I mount blocks 13 of resilient material, such as rubber or the like, said blocks 13 being preferably cut from lengths of resilient material of approximately the section shown. These blocks 13 have transverse passages 14 therein through which are passed bridge-pieces or cleats 15 which are provided at their ends with inwardly angled members 15$^a$ appropriately secured to the aforesaid ring or tread 12 by counter-sunk screws 16.

Figure 3:
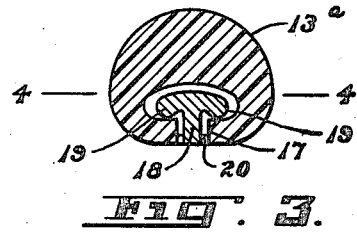
Figure 3 is a detailed section through a slightly modified form of the invention.
Figure 4:
Figure 4 is a sectional plan approximately taken on the line 4—4 in the preceding figure.

In the modified form of the invention shown by Figures 3 and 4 it will be seen that the block 13$^a$ is centrally split on its lower face at 17 and that in lieu of the bridge-pieces or cleats 15 I use a fastening member 18 of approximate rail section, that is to say, it is provided with over-hanging beaded portions 19 beneath which the portions of said block 13$^a$ where it is split at 17 are adapted to bed, and said fastening members 18 are provided at their outer ends with eye-pieces 20 by means of which they can be attached to the ring or tread 12 as above described.

Figure 5:
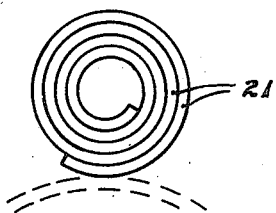
Figure 5 is illustrative of a further modified form of my invention.

In the further modified form of the invention shown by Figure 5, I employ a length or strip 21 of resilient material which is spirally wound upon itself as shown and is adapted for clamping fixture on the ring or tread in the manner above set forth.

Figure 6:
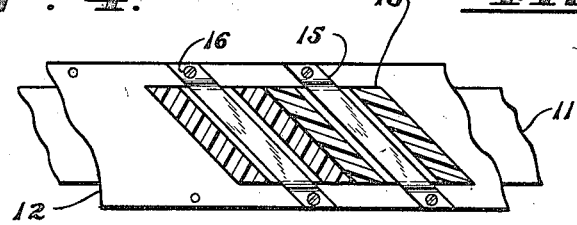
Figure 6 is a plan partly in section of a fragment of a wheel tire incorporating a still further modified form of the invention.

Figure 6 discloses the angular disposition of the blocks 13 relative to the ring or tread 12, said manner of disposing the blocks providing for the application of my invention to wheels of the tractor type.

From the foregoing description and an examination of the drawings it will be clearly apparent to those acquainted with the art that by my invention I provide a composite tire for vehicle wheels which includes a series of radially disposed resilient sections, each of said sections in turn constituting what may be termed a cushion section. Furthermore it will be self-evident that in the event of damage to any one or more of the block sections 13, said damaged section or sections can be readily removed and replaced, whilst it will be also noted that where the blocks are cut from a length of resilient material of either of the cross-sections disclosed, they will by virtue of their method of attachment to the rim or tread 12 provide a resilient tire which is cheaply and effectively manufactured. Whilst I have shown and described the best form of my invention at present known to me I wish it clearly understood that I do not limit myself to the precise shapes of the blocks in cross section disclosed or to the specific manner of their attachment to the rim or tread 12, it being obvious that changes may be made in order to accommodate my invention to other forms of tires for different service conditions.

Having described my invention, what I claim as new and desire to secure by Letters Patent is:

1. In a vehicle wheel the combination of a felly an annular ring peripherally mounted around said felly, a series of transversely disposed resilient blocks detachably mounted on the outer face of said annular ring, a transverse opening through the body portion of each of said resilient blocks, a clamping member passed through said opening in each of said blocks and engaging the body portion thereof, and fastening means engaging said clamping member and said annular ring detachably fastening said clamping member thereto and thereby locking the blocks in operative relation to the wheel.

2. In a vehicle wheel the combination of a felly, an annular ring peripherally mounted on and attached to said felly, a series of transversely disposed and obliquely inclined resilient blocks detachably mounted on the outer face of said annular ring, a transverse opening through the inner body portion of each of said resilient blocks, a clamping member passed through said opening in each of the blocks and engaging the inner body portion thereof, inwardly angled end members laterally extending from the opposite ends of said clamping member adjacent the outer face of said ring, and fastening means engaging said end members and said ring detachably fastening said clamping member to said ring and thereby locking the blocks in operative relation to the wheel.

3. In a vehicle wheel the combination of a felly, an annular ring peripherally mounted on and attached to the outer face of said felly, a series of transversely disposed and obliquely inclined resilient blocks detachably mounted on the outer face of said annular ring in close radial juxtaposition, a transverse opening through the inner body portion of each of said blocks, a clamping member passed through said opening in each of the blocks and engaging the inner wall of said opening and engaging the inner body portion thereof, inwardly angled end members laterally extending from the opposite ends of said clamping members adjacent the outer face of said ring, and fastening means engaging said end members and said ring detachably fastening the clamping members to said ring and thereby locking the blocks in operative relation to the wheel.

In testimony whereof I affix my signature.

JOHN LANG.